United States Patent Office 3,730,872
Patented May 1, 1973

3,730,872
ELECTRIC CELLS
Xavier Marze, Rhone, France, assignor to Rhone-Poulence S.A., Paris, France
No Drawing. Filed May 25, 1971, Ser. No. 146,827
Claims priority, application France, May 27, 1970, 7019358
Int. Cl. B01k 3/10
U.S. Cl. 204—252      9 Claims

ABSTRACT OF THE DISCLOSURE

Electric cells are provided at least one partitioning membrane, at least one membrane consisting essentially of a copolymer derived from at least two, monomers, one of which is acrylonitrile and one of which, is an olefinically unsaturated monomer containing a sulphonic acid group which may be salified, the latter monomer being present in an amount between about 0.4 and about 2 millimols per gram of copolymer and having the formula:

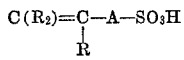

in which each R radical, which may be the same or different, represents hydrogen or an alkyl radical of up to 4 carbon atoms; and A represents:
(i) a divalent wholly hydrocarbon group, the free valencies of which are carried by a wholly aliphatic, saturated or unsaturated, straight or branched chain radical or by an aromatic nucleus, or one of the free valencies of which is carried by an aliphatic carbon atom and the other free valency of which is carried by an aromatic carbon atom,
or (ii) a —O—A'— or —S—A'— group, in which A' represents a group as defined under (i),
or (iii) a divalent radical consisting of aliphatic and/or aromatic groups linked to one another by oxygen or sulphur atoms, the free valencies of which are carried by aliphatic and/or aromatic carbon atoms,
or (iv) a group as defined under (i), (ii) or (iii) wherein one or more of the carbon atoms thereof is substituted.

---

This invention relates to electric cells equipped with ion exchange membranes made of an acrylonitrile copolymer.

In particular, the present invention provides an electric cell which comprises:
(a) An anode,
(b) A cathode,
(c) At least two compartments provided with means of delivery and withdrawal, the compartments being separated by one or more ion exchange membranes, the membrane or, if there are more than one membrane, at least a part of these consist essentially of a copolymer resulting from the copolymerisation of a mixture of at least two copolymerisable monomers, one of which is acrylonitrile and one of which is an olefinically unsaturated monomer containing an optionally salified sulphonic acid group as defined below, the latter monomer being present in an amount between 0.4 and 2, preferably between 0.6 and 1.6 millimols per gram of copolymer.

The acrylonitrile copolymer used in the membranes has a specific viscosity (measured at 25° C. in dimethylformameide, at a concentration of 2 g./l.) which is, in practice, between 0.2 and 2.5, preferably between 0.5 and 1.5.

The olefinically unsaturated monomer which carries a sulphonic acid group, optionally salified, (hereinafter referred to as the "sulphonated monomer") is an acid of formula

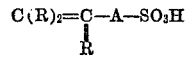

in which each R radical, which may be the same or different, represents hydrogen or an alkyl radical of up to 4 carbon atoms; and A presents:
(i) A divalent wholly hydrocarbon group, the free valencies of which are carried by a wholly aliphatic, saturated or unsaturated, straight or branched chain radical or by an aromatic nucleus, or one of the free valencies of which is carried by an aliphatic carbon atom i.e. a carbon atom forming part of an aliphatic group and the other free valency of which is carried by an aromatic carbon atom i.e. a carbon atoms forming part of an aromatic ring,
or (ii) a —O—A'— or —S—A'— group, in which A' represents a group such as defined under (i),
or (iii) a divalent radical consisting of aliphatic and/or aromatic groups linked to one another by oxygen or sulphur atoms, the free valencies of which are carried by aliphatic and/or aromatic carbon atoms,
or (iv) a group as defined under (i), (ii) or (iii) above, wherein one or more of the carbon atoms thereof is substituted, for example by halogen atoms or hydroxyl radicals.

Preferred sulphonated monomers include those of formula:

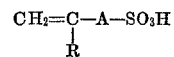

wherein R and A are defined as above.

Specific sulphonated monomers which may be used include the following (optionally salified) acids: allylsulphonic, methallylsulphonic, and allyloxyethylsulphonic acids; 2-butene-1-sulphonic and 3-butene-1-sulphonic acids; hexenesulphonic acids, especially 2-hexene-1-sulphonic acid, 2-methylbutene-1-sulphonic or 3-methylbutene-1-sulphonic acids, and methallyloxyethylsulphonic and 3-allyloxy-2-propanol-1-sulphonic acid; allylthioethylsulphonic and 3-allylthio-2-propanol-1-sulphonic acids; vinylbenzenesulphonic acids, especially 3-vinylbenzene-1-sulphonic acid; vinyloxybenzenesulphonic acids, especially 2-vinyloxy-1-benzenesulphonic acid 4-vinyloxy-1-benzenesulphonic acids; isopropenylbenzenesulphonic acids, especially 2-isopropenyl-1-benzenesulphonic and 4-isopropenyl-1-benzenesulphonic acids; bromovinylbenzenesulphonic acids, especially 2-bromo-3- vinylbenzene-1-sulphonic and 4-bromo-3-vinylbenzene-1-sulphonic acids; α-methylstyrenesulphonic, α-ethylstyrenesulphonic and isopropenylcumenesulphonic acids; mono-, di- and trihydroxyvinylbenzesulphonic acids; 2,5-dichlorovinylbenzene-1-sulphonic, isopropenylnaphthalenesulphonic and vinyldichloronaphthalenesulphonic acids; o- and p-allylbenzenesulphonic acids; o- and p-methallylbenzenesulphonic acids; 4-(o- and p-isopropenylphenyl)-n-butane-1-sulphonic acids; vinylchlorophenylethanesulphonic acids; o- and p-allyloxybenzenesulphonic acids: o- and p-methallyloxybenzenesulphonic acids; vinylhydroxyphenylmethanesulphonic acids vinyltrihydroxyphenylethanesulphonic acids; and 2-isopropl-ethylene-1-sulphonic acid.

The acrylonitrile copolymers of which the membranes of the cells of this invention consist can be binary copolymers, that is to say copolymers which contain only the two types of monomer set out above. They can also be ternary copolymers or quaternary copolymers or copolymers derived from a higher number of monomers; in these cases, olefinically unsaturated monomers, especially vinyl monomers and acrylic monomers, preferably containing fewer than 12 carbon atoms, may be used in addition to the two types of monomers mentioned above. As third monomers which may be used, there may be quoted: vinyl chloride, vinylidene chloride and vinyl ethers; unsaturated ketones such as butenone, phenyl-vinyl-ketone and methyl-isopropenyl-ketone; vinyl esters of saturated carboxylic acids, for example vinyl formate, acetate, propionate, butyrates and benzoate; alkyl esters of unsaturated, monocarboxylic or polycarboxylic, aliphatic acids such as acrylates, maleates, fumarates, citraconates, mesaconates, itaconates and aconitates, for example their methyl, ethyl, propyl, butyl and β-hydroxyethyl esters, or cycloalkyl or aryl esters; acrylamide and methacrylamide and their N-substituted derivatives.

The preparation of the copolymers used in this invention may be carried out according to any known method, for example according to the techniques described in U.S. Pat. No. 2,601,256 or in French Pat. No. 1,213,143 or in Breslow, Journal of Polymer Science, 27, 299–300 (1958). An advantageous process consists in carrying out the copolymerisation in a heterogeneous aqueous phase, in the presence of an inorganic ammonium, alkali metal or alkaline earh metal salt, the other conditions being essentially those described by Houben-Weyl, Methoden der Organischen Chemie 14/1, page 133 et seq.

The cells of this invention can possess two or more compartments. Where they only possess two compartments, they are generally so-called "electrolysis or electrosynthesis" cells in which an anodic oxidation or a cathodic reduction is carried out, the principal purpose of the membrane separating the two compartments being to act as a barrier to the mixture of the constituents of the compartments whilst providing electrical conduction therethrough. Where the cells possess more than two compartments, they are usually in the form of electrodialysis cells which are used essentially to separate the various constituents of ionic solutions, and this separation can, in particular, result in a demineralisation or metathesis. Cells with two or more compartments are generally well known and are, for example, described in the Encyclopedia of Chemical Technology, Kirk-Othmer, 7, 846–865 (2nd edition).

As the present invention essentially relates to the nature of the ion exchange membranes used in the cells, the particular technology and the various forms of the cells do not form a characteristic feature of the invention. One skilled in the art will appreciate the particular requirements necessary for any particular purpose.

Owing to the good mechanical properties of the acrylonitrile copolymers described above, and because of their resistance to the action of acid media and of solvents, the cells of this invention are particularly suitable for treating solutions containing either inorganic or organic acids, and solutions containing aromatic solvents.

The following examples further illustrate the present invention.

EXAMPLE 1

A 10 compartment electrodialyser was set up, using a platinised titanium anode and a titanium cathode.

The various compartments were separated from one another by 1 mm. thick spacer frames; the various dilution compartments were arranged for being fed "in parallel," as were the concentration compartments. The dilution and concentration compartments were separated by membranes having a useful surface of 1 dm.² and were alternately of the cation exchange type (membranes (a)) and of the anion exchange type (membranes (b)). These membranes were constructed as follows:

Membranes (a)

The active constituent of the membranes (a) was a copolymer of acrylonitrile and sodium methallylsulphonate, in a weight ratio of 85.2/14.8, having a specific viscosity [measured at 25° C. in a solution containing 2 g./l. in dimethylformamide (DMF)] of 1.026. The membranes were produced by coating a polyester (net) fabric with a 12% solution of the acrylonitrile copolymer in DMF, and then drying and pressing for 15 minutes at 170° C. under 40 bars pressure; the copolymer was spread in an amount of 293 g./m.². The selective permeability of these membranes was 55% and the substitution resistance was 6Ω-cm.² (these various characteristics were measured in accordance with the methods described in French Pat. No. 1,584,187).

Membranes (b)

These membranes were heterogeneous membranes of which the active constituent (ion exchanger) was a styrene-divinylbenzene copolymer with quaternary ammonium groups, bonded by a vinyl polymer matrix, the whole being reinforced by a polypropylene fabric. They were 0.38 mm. thick, their selective permeability was 83%, their substitution resistance was 18Ω-cm.² and the number of ion exchange groups was 0.61 milliequivalent/g.

The cell described above was used for an electrodialysis carried out in the following manner:

The same solution—7 g. of $Na_2SO_4$/l.—flowed through the electrode compartments, circulating successively in one compartment and then the other; the electrodialysis of an aqueous solution of 35 g. of sodium chloride/l. was carried out under a current of 3 a. After 2 hours 45 minutes, 4 l. of saline solution had been treated in this way and 3.1 l. of saline (NaCl) water containing 0.2 g./l. had been collected at the outlet of the dilution compartments.

32 kilowatt-hours of electricity had been consumed per m.³ of water which had been electrodialysed. The useful membrane surface to be employed to obtain 1 m.³ containing 0.2 g./l., starting from water containing 35 g./l. was 178 m.².

EXAMPLE 2

Example 1 was repeated, using as the membrane (b) a a heterogeneous membrane wherein the active constituent (ion exchanger) was a styrene-divinylbenzene copolymer with quaternary ammonium groups, bonded by a vinyl polymer matrix, the whole being reinforced with a polyester fabric. Its thickness was 0.26 mm., its selective permeability was 81%, the number of ion exchange groups was 0.61 milliequivalent/g. and the substitution resistance was 20Ω-cm.².

The remaining conditions and the results obtained were as follows:
Amount of water subjected to electrodialysis: 4 l.
Concentration of the saline (NaCl) water introduced: 35 g./l.
Duration of electrodialysis: 2 hours 40 mins.
Current: 3 a.
Amount of water electrodialysed (of reduced salt content): 3.1 l.
Concentration of the electrodialysed water: 0.4 g./l.
Consumotion in kw.-hr./m.³ of water electrodialysed: 38.8

EXAMPLE 3

Example 1 was repeated, using as the membrane (b) heterogeneous membrane of which the active constituent was a styrene/divinylbenzene copolymer with quaternary ammonium groups bonded by a vinyl polymer matrix, the whole being reinforced with a polyester fabric. Its thickness was 0.32 mm., the selective permeability was 83%, the number of ion exchange groups was 0.7 milliequivalent/g. and the substitution resistance was 10Ω-cm.².

The remaining conditions and the results obtained were as follows:

Duration of electrodialysis: 2 hrs. 46 mins.
Current: 3 a.
Amount of water subjected to electrodialysis: 4 l.
Concentration of saline (NaCl) water introduced: 35 g./l.
Amount of water electrodialysed (of reduced salt content): 3.1 l.
Concentration of electrodialysed water: 0.4 g./l.
Consumption in kw.-hr./m.³ of water electrodialysed: 26.3

EXAMPLE 4

Example 1 was repeated for carrying out the electrodialysis of a saline (NaCl) water containing 5 g./l.

The remaining conditions and the results obtained were as follows:

Amount of water subjected to electrodialysis: 4 l.
Duration of electrodialysis: 1 hr. 7 mins.
Current: 1.5 a.
Amount of water electrodialysed (of reduced salt content): 3.8 l.
Concentration of the electrodialysed water: 0.2 g./l.
Consumption of kw.-hr./m.$^3$ of water electrodialysed: 2.5
Useful membrane surface to produce 1 m.$^3$ of electrodialysed water per hour: 58.8 m.$^2$

EXAMPLE 5

Example 2 was repeated for carrying out the electrodialysis of a saline (NaCl) water containing 5 g./l.

The remaining conditions and the results obtained were as follows:

Amount of water subjected to electrodialysis: 4 l.
Duration of electrodialysis: 1 hr. 3 mins.
Current: 1.5 a.
Amount of water electrodialysed (of reduced salt content): 3.8 l.
Concentration of the electrodialysed water: 0.35 g./l.
Consumption of kw.-hr./m.$^3$ of water electrodialysed: 2.8

EXAMPLE 6

Example 3 was repeated for carrying out the electrodialysis of a saline (NaCl) water containing 5 g./l.

The remaining conditions and the results obtained were as follows:

Amount of water subjected to electrodialysis: 4 l.
Duration of electrodialysis: 1 hr. 8 mins.
Current: 1.5 a.
Amount of water electrodialysed (of reduced salt content): 3.8 l.
Concentration of the electrodialysed water: 0.25 g./l.
Consumption of kw.-hr./m.$^3$ of water electrodialysed: 2.0

EXAMPLE 7

The oxidation of benzene to para-quinone was carried out in an electrolyser consisting of 6 electrolysis cells; each of these unit cells comprised a lead anode and a lead cathode and was divided into two compartments by an acrylonitrile copolymer membrane. The useful surface of each electrode and membrane was 2 dm.$^2$. The electrode-membrane distance was 2 mm.

The membranes contained, as the active constituent, a copolymer of acrylonitrile and sodium methallylsulphonate in a weight ratio of 82.6/17.4, having a specific viscosity (measured at 25° C. in a 2 g./l. solution in DMF) of 1.143; the membranes were obtained by coating a polyester (net) fabric with an 8% solution of the acrylonitrile copolymer in DMF, and then drying and pressing for 15 minutes at 170° C., under 40 bars. The copolymer was spread over the net in an amount of 199 g./m.$^2$. The selective permeability was 66% and the substitution resistance was 6Ω-cm.$^2$.

The various anode compartments of these 6 units cells were fed in series, the total amount of circulating anolyte consisting initially of 1287 g. of benzene and 1500 cm.$^3$ of 25% by weight aqueous sulphuric acid.

The various cathode compartments of the 6 unit cells were also fed in series, the total amount of circulating catholyte consisting initially of 950 cm.$^3$ of 25% by weight aqueous sulphuric acid.

The electrolysis was carried out for 7 hours 44 minutes under a potential of 3.5 v. and a current of 120 a., the temperature being about 57° C. The anolyte was removed continuously, whilst adding benzene in an amount equal to that which is being withdrawn. 206 g. of para-quinone was thus obtained.

At the end of the process, the mechanical properties of the membranes were practically unchanged; they were also free from points indicating chemical attack.

EXAMPLE 8

An electrolyser was set up, comprising a lead anode in the shape of a disc having a surface area of 0.45 dm.$^2$, and a lead cathode, also in the shape of a disc but having a surface area of 0.2 dm.$^2$. The two electrodes were arranged horizontally above one another, the cathode being placed in a 6 cm. diameter tube. The end of this tube, which dipped into the anolyte, was closed by a membrane of a copolymer of acrylonitrile and sodium methallylsulphonate in the weight ratio of 79.5/20.5, having a specific viscosity (measured at 25° C. in a 2 g./l. solution in DMF) of 1.266. This membrane was obtained by coating a polyester (net) fabric with a 7% solution of the acrylonitrile copolymer in DMF, followed by drying at 60° C. for 20 hours. Its copolymer content was 270 g./m.$^2$. The selective permeability was 66% and its substitution resistance was 5Ω-cm.$^2$.

The anodic oxidation of phenol to para-quinone was carried out in this electrolyser.

The anolyte consisted of a base solution of 300 cm.$^3$ of 10% by weight sulphuric acid and 9 g. of phenol. The catholyte consisted of 60 cm.$^3$ of 10% by weight sulphuric acid. After passing a current of 1.8 a. under 4 v. for 75 minutes at about 47° C., 0.82 g. of quinone was obtained. A series of similar experiments was carried out until the membrane had been used for a total of six hours.

At the end of the process, the mechanical properties of the membrane were practically unchanged; it did not show points indicative of chemical attack; its selective permeability was 64%. Its substitution resistance of 5Ω-cm.$^2$.

I claim:

1. In an electric cell which comprises an anode and a cathode, and one or more ion exchange membranes dividing the cell into at least two compartments, the improvement wherein the membrane, or at least one of the membranes, consists essentially of a copolymer derived from at least two monomers, one of which is acrylonitrile and one of which is an olefinically unsaturated monomer containing a sulphonic acid group which may be salified, selected from allylsulphonic, methallylsulphonic, allyloxyethylsulphonic, 2- and 3-butene-1-sulphonic, hexanesulphonic, 2- and 3-methylbutene-1-sulphonic, methallyloxyethyl, 3-allyloxy-2-propanol-1-sulphonic, allylthioethylsulphonic, 3-allylthio-2-propanol-1-sulphonic, vinylbenzenesulphonic, vinyloxybenzenesulphonic, isopropenylbenzenesulphonic, bromovinylbenzenesulphonic, α-methyl- and a - ethylstyrenesulphonic. isopropenylcumenesulphonic, mono-, di- and tri-hydroxyvinylbenzenesulphonic, 2,5-dichlorovinylbenzene-1-sulphonic, isopropenylnaphthalenesulphonic, vinyldichloronaphthalenesulphonic o- and p-allylbenzenesulphonic, o- and p-methallylbenzenesulphonic, 4-(o- and p-isopropenylphenyl)-n-butane-1-sulphonic, vinylchlorophenylethanesulphonic, o- and p-allyloxybenzenesulphonic, o- and p-methallyloxybenzenesulphonic, vinylhydroxyphenylmethanesulphonic, vinyltrihydroxyphenylethanesulphonic and 2-isopropyl-ethylene-1-sulphonic acids, the latter monomer being present in an amount between about 0.4 and about 2 millimols per gram of copolymer.

2. A cell according to claim 1 wherein the olefinically unsaturated monomer is present in an amount between about 0.6 and about 1.6 millimols per gram of copolymer.

3. A cell according to claim 1 wherein the olefinically unsaturated monomer is methallylsulphonic acid or sodium methallylsulphonate.

4. A cell according to claim 1 wherein the copolymer is derived from a third monomer.

5. A cell according to claim 4 wherein the third monomer is a vinyl or acrylic monomer containing less than 12 carbon atoms.

6. A cell according to claim 5 wherein the third monomer is vinyl chloride, vinylidene chloride, a vinyl ether, butenone, phenyl vinyl ketone, methyl isopropenyl ketone, vinyl formate, vinyl acetate, vinyl propionate, vinyl butyrate, vinyl benzoate, a methyl, ethyl, propyl, butyl, β-hydroxyethyl, cycloalkyl or aryl acrylate, maleate, fumarate, citraconate, mesaconate, itaconate or aconitate, acrylamide or methacrylamide.

7. A cell according to claim 1 wherein the copolymer has a specific viscosity, measured at a concentration of 2 g./l. in dimethylformamide at 25° C., between about 0.2 and about 2.5.

8. A cell according to claim 7 wherein the said viscosity is between about 0.5 and about 1.5.

9. A cell according to claim 1 wherein the anode is platinised titanium and the cathode is titanium or both anode and cathode are of lead.

References Cited
UNITED STATES PATENTS 3,395,133    7/1968    D'Alelio _____ 260—2.2 R JOHN H. MACK, Primary Examiner A. C. PRESCOTT, Assistant Examiner U.S. Cl. X.R.

204—296, 301; 260—2.2 R